US012205739B2

(12) United States Patent
Vaidya et al.

(10) Patent No.: US 12,205,739 B2
(45) Date of Patent: Jan. 21, 2025

(54) EXTRUSION-COMPRESSION METHOD FOR PRODUCING BONDED PERMANENT MAGNETS

(71) Applicants: UT-Battelle, LLC, Oak Ridge, TN (US); University of Tennessee Research Foundation, Knoxville, TN (US)

(72) Inventors: Uday Kumar Vaidya, Birmingham, AL (US); Mariappan Parans Paranthaman, Knoxville, TN (US); Vlastimil Kunc, Knoxville, TN (US); Ahmed A. Hassen, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 17/529,588

(22) Filed: Nov. 18, 2021

(65) Prior Publication Data

US 2022/0157499 A1 May 19, 2022

Related U.S. Application Data

(60) Provisional application No. 63/115,627, filed on Nov. 19, 2020.

(51) Int. Cl.
*H01F 1/147* (2006.01)
*B22F 1/10* (2022.01)
(Continued)

(52) U.S. Cl.
CPC ................ *H01F 1/147* (2013.01); *B22F 1/10* (2022.01); *B22F 3/02* (2013.01); *H01F 1/057* (2013.01);
(Continued)

(58) Field of Classification Search
CPC ...... H01F 1/147; H01F 1/057; H01F 41/0253; H01F 1/083; H01F 1/37; H01F 1/26;
(Continued)

(56) References Cited

U.S. PATENT DOCUMENTS 4,299,792 A 11/1981 Nunn
4,664,723 A 5/1987 Ishii et al.
(Continued)

OTHER PUBLICATIONS

Gandha, K., et al., "Recycling of additively printed rare-earth bonded magnets", Waste Management (2019), Revised Mar. 23, 2019, Accepted Apr. 19, 2019, 90, pp. 94-99.
(Continued)

*Primary Examiner* — Adil A. Siddiqui
(74) *Attorney, Agent, or Firm* — Scully, Scott, Murphy & Presser, P.C.

(57) ABSTRACT

A method for producing a bonded magnet, comprising: (i) low-shear compounding of a thermoplastic polymer and magnetic particles to form an initial homogeneous mixture thereof; (ii) feeding the initial homogeneous mixture into a plasticator comprising a low-shear single screw rotating unidirectionally toward a die orifice and housed within a heated barrel to result in heating of the initial homogeneous mixture until the thermoplastic polymer melts and forms a further homogeneous mixture, wherein said further homogeneous mixture is transported within threads of the single screw towards the die orifice and exits the die orifice as a solid pellet; (iii) conveying the solid pellet into a mold and compression molding the pellet in the mold, to form the bonded magnet, wherein the bonded magnet possesses a magnetic particle loading of at least 80 vol % and exhibits one or more magnetic properties varying by less than 5% throughout the bonded magnet.

33 Claims, 5 Drawing Sheets

(51) Int. Cl.
*B22F 3/02* (2006.01)
*H01F 1/057* (2006.01)
*H01F 41/02* (2006.01)

(52) U.S. Cl.
CPC .... *H01F 41/0253* (2013.01); *B22F 2301/355* (2013.01)

(58) Field of Classification Search
CPC ............... H01F 1/0578; H01F 41/0246; H01F 41/0266; B22F 1/10; B22F 3/02; B22F 2301/355; B22F 1/108; B22F 3/227; B22F 3/03; B22F 2998/10; C22C 2202/02
See application file for complete search history.

(56) References Cited

U.S. PATENT DOCUMENTS

| | | | | |
|---|---|---|---|---|
| 10,586,640 | B2 | 3/2020 | Paranthaman et al. | |
| 10,766,181 | B2 | 9/2020 | Paranthaman et al. | |
| 2007/0007685 | A1 | 1/2007 | Gleich et al. | |
| 2018/0122570 | A1* | 5/2018 | Li | B33Y 10/00 |
| 2018/0215854 | A1 | 8/2018 | Paranthaman et al. | |
| 2018/0229442 | A1* | 8/2018 | Ucar | C22C 47/14 |
| 2020/0023556 | A1 | 1/2020 | Kunc et al. | |

OTHER PUBLICATIONS

Kumar, V., et al., "High-performance molded composites using additively manufactured preforms with controlled fiber and pore morphology", Additive Manufacturing (2021), Accepted Nov. 20, 2020, Available online Nov. 27, 2020, 37, 10 pages, 101733.
Mungale, K., et al., "Compression molding of anisotropic NdFeB bonded magnets in a polycarbonate matrix", Materialia (2021), Accepted Jul. 11, 2021, Available online Jul. 28, 2021, 19, 6 pages, 101167.
Sands, J.M., et a., "Manufacturing of a Composite Tailcone for an XM-1002 Training Round", Army Research Laboratory, Feb. 2008, 23 pages, ARL-TR-4381.
Gandha, K., et al., "Additive manufacturing of highly dense anisotropic Nd—Fe—B bonded magnets", Scripta Materialia (2020), Revised Mar. 4, 2020, Accepted Mar. 7, 2020, pp. 91-95, 183.
Liu, X.B., et al., "Packing bimodal magnetic particles to fabricate highly dense anisotropic rare earth bonded permanent magnets", RSC Adv., 2023, Accepted May 25, 2023, pp. 17097-17101, 13.

* cited by examiner

EXTRUSION-COMPRESSION METHOD FOR PRODUCING BONDED PERMANENT MAGNETS

CROSS REFERENCE TO RELATED APPLICATION

The present application claims benefit of U.S. Provisional Application No. 63/115,627, filed on Nov. 19, 2020, all of the contents of which are incorporated herein by reference.

STATEMENT REGARDING FEDERALLY SPONSORED RESEARCH

This invention was made with government support under Prime Contract Nos. DE-AC05-000R22725 and AC02-07CH11358 awarded by the U.S. Department of Energy. The government has certain rights in the invention.

FIELD OF THE INVENTION

The present invention relates generally to bonded magnets and methods for producing them. The invention particularly relates to methods employing extrusion and/or compression for producing bonded magnets.

BACKGROUND OF THE INVENTION

Permanent bonded magnets are well known. However, there is an increasing demand for bonded permanent magnets of various shapes, including complex shapes, with higher mechanical strength and greater and more uniform magnetic field strengths. Efforts to achieve bonded magnets with such a combination of superior properties has been largely unsuccessful thus far.

In the conventional process, magnetic particles are admixed with a thermoplastic polymer that functions as a binder. In order to increase the mechanical strength of the thermoplastic polymer, the conventional process typically increases the molecular weight and/or degree of branching in the thermoplastic polymer. However, increasing the molecular weight and/or degree of branching of the thermoplastic material also generally results in an elevation of the melt viscosity and melting point, all of which impedes flow. In an effort to increase the magnetic field strength, a higher density of magnetic particles (e.g., at least 80 wt %) may be attempted, but doing so generally also results in an elevation of the melt viscosity and melting point. To counteract the resistance to flow, the thermoplastic material is generally heated to a higher temperature at which a more flow able melt results; however, the increased temperature may degrade both the polymer binder and magnetic particles.

There would be a significant advantage in a method that could produce bonded magnets of any desired shape and with higher density, mechanical strengths, and magnetic field strengths, without requiring the unacceptably high elevated temperatures necessary for inducing a sufficiently flowable melt that could degrade either the polymer binder or magnetic particles. There would be a further advantage in such a method that could recycle used bonded magnet material, particularly by using bonded magnet material as a starting (feed) material to produce recycled bonded magnets. There would be a further advantage in such a method that could produce complex-shaped bonded magnets.

There would be a further advantage in such a method that could provide such a high magnetic loading and also provide a bonded magnet possessing a substantially uniform dispersal of the magnetic particles throughout the bonded magnet and also exhibits substantially uniform magnetic properties, such as a maximum energy product (BH.) that varies by less than 5% throughout the bonded magnet.

SUMMARY OF THE INVENTION

The present disclosure is foremost directed to a method for producing bonded magnets at exceptionally high loadings (e.g., at least or above 80 or 85 vol %) with exceptionally uniform magnetic properties. The method is also advantageously capable of producing such bonded magnets in a variety of shapes, including complex shapes (e.g., gear, grating, tool, or helmet). The method is also advantageously capable of producing such exceptional bonded magnets from used (end-of-life or spent) bonded magnet material.

To achieve the above exceptional characteristics, the method initially employs a low-shear compounding process (e.g., a low-shear twin-screw extrusion process) on a mixture of thermoplastic polymer and magnetic particles to form an initial homogeneous mixture of the foregoing components. The low-shear condition is employed primarily to avoid breakage of the magnetic particles, particularly in the case where the magnetic particles have an anisotropic or non-spherical shape (e.g., filaments or plates). In a second step, the initial homogeneous mixture is fed into a plasticator containing a low-shear single screw rotating unidirectionally toward a die orifice, wherein the low-shear single screw is housed within a heated barrel to result in heating of the initial homogeneous mixture until the thermoplastic polymer melts and forms a further homogeneous mixture. As the low-shear single screw rotates, the further homogeneous mixture is transported within threads of the single screw towards the die orifice and exits the die orifice as a solid pellet. In a third step, the solid pellet is conveyed (in some embodiments, automatically, typically while the pellet is hot, e.g., by means of a hopper or chute) into a mold, followed by compression molding of the pellet (typically, molten) in the mold. In some embodiments, where magnetically anisotropic particles are used, the pellet material is exposed to an external magnetic field during compression molding to result in magnetic and/or physical alignment of the anisotropic magnetic particles in the bonded magnet.

Although compression molding for producing bonded magnets is known, the resulting bonded magnet typically exhibits a significant degree of variation in its magnetic properties (e.g., 10% or over) primarily as a result of a lack of homogeneity in the precursor material undergoing compression molding. The significant variation in magnetic properties are unacceptable for certain critical applications. Thus, the manufacture of bonded magnets having a low variation (e.g., of no more than 5%) in magnetic properties, as presently described, represents a significant advance in the art of bonded magnets.

BRIEF DESCRIPTION OF THE FIGURES

FIG. 4A shows a stress vs. strain curve for recycled NdFeB/nylon bonded magnet at 70 vol % loading with no carbon fiber. FIG. 4B shows a stress vs. strain curve for recycled NdFeB/nylon bonded magnet at 70 vol % loading and with carbon fiber.

FIG. 5A shows images of dog-bone samples of NdFeB/nylon with no carbon fiber and FIG. 5B shows images of NdFeB/nylon with carbon fiber containing bonded magnets.

DETAILED DESCRIPTION OF THE INVENTION

Figure 1:
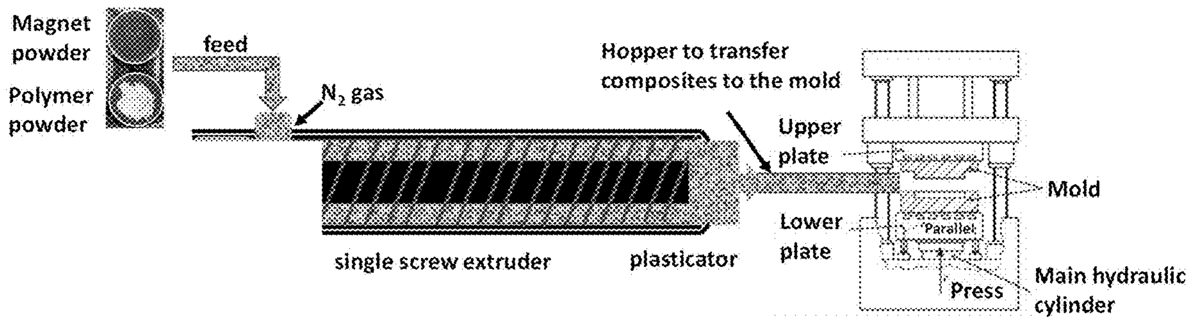
FIG. 1. Schematic illustration of the extrusion compression molding process.

In the disclosed process, a low-shear compounding process (step i) is first used to form an initial homogeneous mixture of a thermoplastic polymer and magnetic particles. In some embodiments, where the process functions to recycle spent (end-of-life) bonded magnet material, the spent bonded magnet material is pulverized (e.g., by cryogenic pulverization) to a particulate form which is then low-shear compounded (optionally, with additional polymer, additional magnetic particles, and/or filler material, such as carbon fiber) to further decrease the particle size and produce an initial homogeneous mixture of the particles of spent bonded magnet material. The low-shear compounding process generally heats the mixture at or above the melting point of the thermoplastic polymer. Low-shear compounding processes are well known in the art, such as evidenced by, for example, T. Lusiola et al., *Journal of the European Ceramic Society*, 34(10), 2265-2274 (2014). The term "low-shear," as used herein, generally refers to revolution per minute (rpm) of the screw of no more than or less than 500 rpm, or no more than or less than 400 rpm, 300 rpm, 200 rpm, 100 rpm, or 50 rpm. The low-shear compounding process may be achieved by, for example, a low-shear twin-screw extruder, or more particularly, a low-speed late fusion (LSLF) twin-screw extruder as well known in the art. The low-shear compounding process advantageously avoids breakage of magnetic particles, particularly in the case of anisotropically (e.g., elongated, fiber, or platelet) shaped or non-spherical magnetic particles. The level of homogeneity can be determined at least in part by visualization of samples using microscopy.

In a second step (step ii), the initial homogeneous mixture produced in the low-shear compounding process of step (i) is fed into a low-shear single screw plasticator in which is housed a low-shear single screw rotating unidirectionally toward a die orifice. The low-shear single screw is housed within a heated barrel, typically with multiple heating zones, to result in heating of the initial homogeneous mixture until the thermoplastic polymer melts and forms a further homogeneous mixture. The further homogeneous mixture is transported within threads of the single screw towards the die orifice and exits the die orifice as a solid pellet. Low-shear plasticators, as described above, are well known in the art, as evidenced by, for example, U.S. Application Pub. No. 2007/0007685 and U.S. Pat. No. 4,299,792, the contents of which are herein incorporated by reference. The heating zones of the barrel are typically arranged such that the first one or two heating zones at which the initial homogeneous mixture enters the single screw are maintained at a temperature slightly below (e.g., 10-20° C. below) the melting point of the thermoplastic polymer, while one or more heating zones toward the middle section of the single screw are maintained at a temperature at or slightly above (e.g., 5-20° C. above) the melting point of the thermoplastic polymer, and the one or more heating zones toward the exit (die or orifice end) section of the single screw are maintained at or slightly below the melting point of the thermoplastic polymer to result in a solidified pellet composed of the further homogeneous mixture. A mechanized cutter may be positioned at the orifice to cut sections of extrudate to form the pellets.

In a third step (step iii), one or more pellets produced in step (ii) are conveyed to a mold located in (or conveyed into) a compression device. The compression device typically operates by pressing the mold (with pellets inside) by means of two plates (platens), one above and one below the mold. The compression device can be, for example, a press, such as a hydraulic press. The hydraulic press may be, for example, a 150-ton hydraulic press, and may have a temperature control system for upper and lower plates. The maximum temperature attainable on the plates may be, for example, 360° C. However, the temperature of the plates is usually at or slightly above (e.g., up to 10, 20, 30, 40, or 50° C. above) the melting point of the thermoplastic polymer. Typically, a metal cap is placed on top of the mold to cover the pellets before the compression step. The mold may have a simple shape (e.g., tile, bar, or cylinder) or a complex shape (e.g., gear, helmet, or grating).

In some embodiments, steps (i)-(iii) or at least steps (ii) and (iii) are performed on a single automated machine possessing an extruding section for steps (i) and/or (ii) and a compression section for step (iii), wherein the two sections are connected to each other in the machine. To make the process automated, the machine possesses a built-in conveying (transferring) means to transport pellets from the plasticator to the compression device. The conveying means may be, for example, a chute or hopper which automatically transports the pellets from the extruder to the mold.

The shape of the magnetic object that is ultimately built can be suited to any application in which a magnetic material having a significant degree of mechanical strength and exceptional magnetic properties is desired, such as electrical motors. Although the shape of the magnetic material ultimately produced can be simple, e.g., a planar object, such as a film or coating of a desired two-dimensional shape (e.g., square or disc), the manufacturing process described herein is capable of producing complex (i.e., intricate) shapes. Some examples of intricate shapes include rings, filled or unfilled tubes, filled or unfilled polygonal shapes having at least or more than four vertices, gears, and irregular (asymmetric) shapes. Other possible shapes include arcs with an angle greater than 90 degrees and less than 180 degrees, preferably in the range 120-160 degrees. The presently described method can achieve such intricate shapes by employing a correspondingly complex shaped mold.

In some embodiments, the process functions to recycle spent (end-of-life) bonded magnet material. To achieve this, the spent bonded magnet material is typically pulverized (e.g., by cryogenic pulverization) to a particulate form which is then low-shear compounded (optionally, with additional thermoplastic polymer, additional magnetic particles, and/or filler material, such as carbon fiber) to further decrease the particle size and produce an initial homogeneous mixture of the particles of spent bonded magnet material. The additional thermoplastic polymer, additional magnetic particles, and/or filler material, if included, may be added before or during step (i) or step (ii).

The thermoplastic polymer may be any polymer useful in forming a bonded magnet. The thermoplastic polymer may be or include segments of, for example, a polyamide (e.g., PA-6, PA-66, PA-11, or PA-12), polyphenylene sulfide (PPS), polyurethane, polyester (or biopolyester, such as polytrimethylene terephthalate), polyacrylonitrile (PAN), polycarbonate (PC), polystyrene, polybutadiene, polyether, polybenzimidazole, lignin, or combination thereof. In some embodiments, a copolymer of any of the above recited polymers is used. In more particular embodiments, the thermoplastic polymer (either new or in recycled bonded material) is selected from nylon, PPS, and polycarbonate. In other embodiments, a physical blend of any of the above recited polymers or copolymers thereof is used, or only a single polymer from the above recited polymers is used.

In some embodiments, the thermoplastic polymer is a crosslinkable polymer (i.e., "hybrid polymer"). The crosslinkable polymer possesses groups that ultimately undergo crosslinking, either with the same or other groups in the same polymer, or with the same or other groups in a different polymer or compound (e.g., a rapid or latent crosslinking agent) that has been admixed with the polymeric binder. The hybrid polymer may be, for example, a reactive polymer, such as polyurethane and/or epoxy, which may be reacted with rapid or latent crosslinking agents, such as moisture provided by a humid environment in the case of urethanes, or an aromatic amine and a polyphenol in the case of epoxies.

Some examples of hybrid polymers include, for example, polyurethanes, epoxy-containing polymers, and polymers containing vinyl acetate units. The hybrid polymer may include a backbone and/or pendant groups that are aromatic, in which case the hybrid polymer may be referred to as an "aromatic polymer". In embodiments of this invention, the polymer material is prepared with a rapid or latent crosslinking agent, such as moisture provided by a humid environment in the case of urethanes, or an aromatic amine and/or a polyphenol in the case of epoxies. The polymer can be blended with a limited quantity of a first curing agent to obtain a partially reacted pre-polymer at moderate temperatures, such as during the compound step (i), and a second less reactive curing agent, such as a phenolic curing agent, for higher temperature curing in step (ii) and/or (iii).

In one set of embodiments, the magnetic particles are soft magnetic particles. The soft magnetic particles may be anisotropically shaped or isotropically shaped (e.g., spherical), and may independently be magnetically anisotropic or isotropic. The soft magnetic particles are typically composed of an iron-containing alloy that possesses a soft magnet characteristic. The iron-containing alloy contains iron alloyed with one, two, or more other elements, which may be metals or metalloids, provided that the iron-containing alloy possesses a soft magnet property. Some examples of soft magnet compositions include iron-silicon (e.g., silicon-containing steel), iron-cobalt (e.g., permendurs), iron-nickel (e.g., permalloys), iron-aluminum, iron-phosphorus, iron-cobalt-silicon, iron-nickel-silicon, iron-aluminum-silicon, iron-phosphorus-silicon, iron-nickel-cobalt (e.g., perminvars), iron-chromium, iron-nickel-chromium, and iron-silicon-chromium alloy compositions. Steel compositions necessarily also include a few percent of carbon. Generally, the iron-containing alloy contains iron in an amount of at least 20, 30, 40, 50, 60, 70, 80, 90, or 95 wt. % but less than 100 wt. %, or an amount within a range bounded by any two of the foregoing values. The one or more elements alloyed with iron may be included in an amount of at least, above, or no more than, for example, 1, 2, 5, 10, 15, or 20 wt. %. The iron-containing alloy may or may not also include minor amounts (e.g., up to or less than 10, 5, 2, or 1 wt. %) of one or more less common alloying elements, such as molybdenum, manganese, vanadium, boron, copper, or zinc, provided the composition maintains a soft magnet characteristic. The soft magnet alloy may also be amorphous or nanocrystalline. The nanocrystalline composition may be, for example, in the class of Finemet-type compositions, such as $Fe_{73.5}Si_{13.5}B_9Cu_3Nb_1$, such as described in Z. Xue et al., Metals, 10, 122, 2020, the contents of which are herein incorporated by reference. Micron-sized particles having a Finemet composition are described in, for example, Z. Guo et al., *Materials and Design*, vol. 192, 108769, July 2020, the contents of which are herein incorporated by reference.

In some embodiments, the soft magnet composition includes silicon in addition to iron. In particular embodiments, the soft magnetic particles have a silicon-containing steel composition. The silicon may be present in any amount that imparts a soft magnetic property to the steel or other alloy. The silicon may be present in the steel or any other soft magnet alloy composition mentioned above in an amount of precisely, about, or at least, for example, 0.5 wt. %, 1 wt. %, 1.5 wt. %, 2 wt. %, 2.5 wt. %, 3 wt. %, 3.5 wt. %, 4 wt. %, 4.5 wt. %, 5 wt. %, 5.5 wt. %, 6 wt. %, or 6.5 wt. %, or the silicon may be present in an amount within a range bounded by any two of the foregoing values, e.g., 1-6.5 wt. %, 2-6.5 wt. %, 3-6.5 wt. %, 4-6.5 wt. %, 5-6.5 wt. %, or 6-6.5 wt. % of the silicon-containing steel composition. Moreover, any of the silicon-containing alloys described above may be amorphous, crystalline, or polycrystalline.

In another set of embodiments, the magnetic particles are hard (permanent) magnetic particles. The term "hard magnetic" or "permanent magnetic" refers to any of the ferromagnetic compositions, known in the art, that exhibit a permanent magnetic field with high coercivity, generally at least or above 300, 400, or 500 Oe. Thus, the permanent magnetic particles are not paramagnetic or superparamagnetic particles. The hard magnetic particles may be anisotropically shaped or isotropically shaped (e.g., spherical), and may independently be magnetically anisotropic or isotropic.

The permanent magnetic particles are typically metallic, and often contain at least one element selected from iron, cobalt, nickel, and rare earth elements, wherein the rare earth elements are generally understood to be any of the fifteen lanthanide elements along with scandium and yttrium. In particular embodiments, the permanent magnetic particles include iron, such as magnetite, lodestone, or alnico. In other particular embodiments, the permanent magnetic particles contain at least one rare earth element, particularly samarium, praseodymium, and/or neodymium. A particularly well-known samarium-based permanent magnet is the samarium-cobalt (Sm—Co alloy) type of magnet, e.g., $SmCo_5$ and $Sm_2Co_{17}$. A particularly well-known neodymium-based permanent magnet is the neodymium-iron-boron (Nd—Fe—B) type of magnet, more specifically $Nd_2Fe_{14}B$. Other rare earth-containing magnetic compositions include, for example, MnBi, $Pr_2Co_{14}B$, $Pr_2Fe_{14}B$, and Sm—Fe—N. Particle versions of such magnetic compositions are either commercially available or can be produced by well known procedures, as evidenced by, for example, P. K. Deheri et al., "Sol-Gel Based Chemical Synthesis of $Nd_2Fe_{14}B$ Hard Magnetic Nanoparticles," *Chem. Mater.,* 22 (24), pp. 6509-6517 (2010); L. Y. Zhu et al., "Microstructural Improvement of NdFeB Magnetic Powders by the Zn Vapor Sorption Treatment," *Materials Transactions*, vol. 43, no. 11, pp. 2673-2677 (2002); A. Kirkeminde et al., "Metal-Redox Synthesis of MnBi Hard Magnetic Nanoparticles," *Chem. Mater.,* 27 (13), p. 4677-4681 (2015); and U.S. Pat. No. 4,664,723 ("Samarium-cobalt type magnet powder for resin magnet"). The permanent magnetic particles may also have a rare-earth-free type of magnetic composition, such as a Hf—Co or Zr—Co alloy type of permanent magnet, such as described in Balamurugan et al., *Journal of Physics: Condensed Matter*, vol. 26, no. 6, 2014, the contents of which are herein incorporated by reference in their entirety. In some embodiments, any one or more of the above-described types of magnetic particles are excluded from the initial or further homogeneous mixture produced in steps (i) and (ii) and from the resulting bonded permanent magnet.

The magnetic particles can have any suitable particle size. The magnetic particles can be, for example, nanoparticles (e.g., 1-500 nm) or microparticles (e.g., 1-500 microns). In some embodiments, the magnetic particles have a size of no more than or less than 1 mm, 800 microns, 500 microns, 400 microns, 300 microns, 200 microns, 100 microns, 50 microns, 1 micron, 0.5 micron, 0.2 micron, or 0.1 micron, or a distribution of particles bounded by any two of the foregoing values.

The bonded magnet, as produced by the above described method, possesses a magnetic particle loading of at least or above 80 vol %, 85 vol %, or 90 vol %, or a loading within a range bounded by any two of the foregoing values. In some embodiments, the foregoing magnetic particle loading is specifically for $Nd_2Fe_{14}B$ (NdFeB) particles. As NdFeB has a density of approximately 7.6 g/cm$^3$, 95 wt. % loading corresponds to approximately 73 vol % loading, or conversely, 82 vol % loading corresponds to approximately 97 wt. % or higher loading.

The bonded magnet, as produced by the above described method, also preferably exhibits a maximum energy product ($BH_{max}$) varying by no more than or less than 5% throughout the bonded magnet composition, wherein the bonded magnet produced by the above described method typically exhibits a maximum energy product of at least 10, 11, 12, 13, 14, or 15 MGOe. The bonded magnet, as produced by the above described method, may simultaneously or alternatively vary by less than 5% in one or more other magnetic properties, such as intrinsic coercivity or remanence. In some embodiments, any one or more magnetic properties of the bonded magnet may vary by no more than or less than 4%, 3%, 2%, or 1% throughout the bonded magnet composition. Notably, the present invention achieves this exceptional homogeneity in magnetic properties at least by employing an initial low-shear compounding step followed by a low-shear single screw plasticating step, which is distinct from the conventional art, before compressing the pellets produced in the plasticating step. The present invention also achieves an exceptional maximum energy product by virtue of the exceptionally high magnetic particle loading achievable by the presently described method. Both the exceptionally high magnetic particle loading and exceptionally high maximum energy product are further distinct from the conventional art.

In addition to the exceptional homogeneity in magnetic properties, the bonded magnet, as produced herein, possesses exceptional mechanical properties. In some embodiments, the bonded magnet possesses a tensile strength of at least 8, 9, 10, 11, 12, 13, 14, or 15 MPa, or a tensile strength within a range bounded by any two of the foregoing values. In some embodiments, the bonded magnet possesses a strain to failure (failure strain) of about or at least 0.1, 0.2, 0.3, 0.4, 0.5, 0.6, 0.7, 0.8, 0.9, 1.0, 1.1, 1.2, 1.3, 1.4, 1.5, or 2, or a strain to failure within a range bounded by any two of the foregoing values.

In some embodiments, the initial or further homogeneous mixture in step (i) or step (ii), respectively, includes non-magnetic particles having a composition that confers additional tensile strength to the bonded magnet. In some embodiments, non-magnetic particles are mixed into the initial homogeneous mixture in step (ii) by feeding the initial homogeneous mixture along with non-magnetic particles into the low-shear single screw of the plasticator. The non-magnetic particles can be composed of, for example, carbon, metal oxide, or metal carbon particles. The non-magnetic particles may have any suitable morphology, including, for example, spheroidal particles or filaments. The non-magnetic particles may be present in the homogeneous mixture or resulting bonded magnet in any desired amount, e.g., at least, above, up to, or less than 1, 2, 5, 10, 20, 30, 40, or 50 wt. %, or in an amount within a range bounded by any two of the foregoing values.

In some embodiments, the non-magnetic particles are filaments. The term "filament," as used herein, refers to a particle having a length dimension at least ten times its width dimension, which corresponds to an aspect ratio (i.e., length over width) of at least or above 10:1 (i.e., an aspect ratio of at least 10). In different embodiments, the filament has an aspect ratio of at least or above 10, 20, 50, 100, 250, 500, 1000, or 5000. In some embodiments, the term "filament" refers only to particles having one dimension at least ten times greater than the other two dimensions. In other embodiments, the term "filament" also includes particles having two of its dimensions at least ten times greater than the remaining dimension, which corresponds to a platelet morphology. Notably, the magnetic particles may also (and independently) have a spheroidal, platelet, or elongated (e.g., filamentous) morphology. In some embodiments, the magnetic particles are filaments having any of the aspect ratios described above. Notably, magnetic particles having an anisotropic (e.g., elongated or filamentous) shape are generally more amenable to alignment in a directional magnetic field.

In particular embodiments, carbon particles are included in the initial or further homogeneous mixture in step (i) or step (ii), respectively, to include carbon particles in the resulting bonded magnet. The carbon particles can be, for example, carbon fibers, carbon nanotubes, platelet nanofibers, graphene nanoribbons, or a mixture thereof. In the case of carbon fibers, these may be any of the high-strength carbon fiber compositions known in the art. Some examples of carbon fiber compositions include those produced by the pyrolysis of polyacrylonitrile (PAN), viscose, rayon, lignin, pitch, or polyolefin. The carbon nanofibers may also be vapor grown carbon nanofibers. The carbon fibers can be micron-sized carbon fibers, generally having inner or outer diameters of 1-20 microns or sub-range therein, or carbon nanofibers, generally having inner or outer diameters of 10-1000 nm or sub-range therein. In the case of carbon nanotubes, these may be any of the single-walled or multi-walled carbon nanotubes known in the art, any of which may or may not be heteroatom-doped, such as with nitrogen, boron, oxygen, sulfur, or phosphorus. In some embodiments, any one or more types of carbon particles may be excluded from the mixture, or carbon particles may be excluded altogether from the mixture. The carbon filament, particularly the carbon fiber, may possess a high tensile strength, such as at least 500, 1000, 2000, 3000, 5000, or 10,000 MPa. In some embodiments, the carbon filament, particularly the carbon fiber, possesses a degree of stiffness of the order of steel or higher (e.g., 100-1000 GPa) and/or an elastic modulus of at least 50 Mpsi or 100 Mpsi.

In other embodiments, metal oxide particles (or more particularly, filaments) are included in the initial or further homogeneous mixture in step (i) or step (ii), respectively, to include metal oxide particles in the resulting bonded magnet. Metal oxide particles or filaments (also known as metal oxide nanowires, nanotubes, nanofibers, or nanorods), if present, can be, for example, those having or including a main group metal oxide composition, wherein the main group metal is generally selected from Groups 13 and 14 of the Periodic Table. Some examples of Group 13 oxides include aluminum oxide, gallium oxide, indium oxide, and combinations thereof. Some examples of Group 14 oxides include silicon oxide (e.g., glass), germanium oxide, tin oxide, and combinations thereof. The main group metal oxide may also include a combination of Group 13 and Group 14 metals, as in indium tin oxide. In other embodiments, the metal oxide particles or filaments have or include a transition metal oxide composition, wherein the transition metal is generally selected from Groups 3-12 of the Periodic Table. Some examples of transition metal oxides include scandium oxide, yttrium oxide, titanium oxide, zirconium oxide, hafnium oxide, vanadium oxide, niobium oxide, tantalum oxide, chromium oxide, molybdenum oxide, tungsten oxide, manganese oxide, iron oxide, ruthenium oxide, cobalt oxide, rhodium oxide, iridium oxide, nickel oxide, palladium oxide, copper oxide, zinc oxide, and combinations thereof. The metal oxide particle or filament may also include a combination of main group and transition metals. The metal oxide particle or filament may also include one or more alkali or alkaline earth metals in addition to a main group or transition metal, as in the case of some perovskite nanowires, such as $CaTiO_3$, $BaTiO_3$, $SrTiO_3$, and $LiNbO_3$ nanowires, and as further described in X. Zhu, et al., *J. Nanosci. Nanotechnol.,* 10(7), pp. 4109-4123, July 2010, and R. Grange, et al., *Appl. Phys. Lett.,* 95, 143105 (2009), the contents of which are herein incorporated by reference. The metal oxide particle or filament may also have a spinel composition, as in $Zn_2TiO_4$ spinel nanowires, as described in Y. Yang et al., *Advanced Materials*, vol. 19, no. 14, pp. 1839-1844, July 2007, the contents of which are herein incorporated by reference. In some embodiments, the metal oxide particles or filaments are constructed solely of metal oxide, whereas in other embodiments, the metal oxide filaments are constructed of a coating of a metal oxide on a non-metal oxide filament, e.g., silica-coated or germanium oxide-coated carbon nanotubes, as described in M. Pumera, et al., *Chem Asian J.,* 4(5), pp. 662-667, May 2009, and M. Pumera, et al., *Nanotechnology,* 20(42), 425606, 2009, respectively, the contents of which are herein incorporated by reference. The metal oxide layer may alternatively be disposed on the surface of a metallic filament. The metal oxide filaments may also have any of the lengths and diameters described above. In some embodiments, metal oxide particles are excluded from the bonded magnet.

In other embodiments, metal particles (or more particularly, filaments) are included in the initial or further homogeneous mixture in step (i) or step (ii), respectively, to include metal particles in the resulting bonded magnet. Metal particles or filaments (also known as metal nanowires, nanotubes, nanofibers, or nanorods), if present, can be, for example, those having or including a main group metal composition, such as a silicon, germanium, or aluminum composition, all of which are well known in the art. The metal particles can also have a composition including one or more transition metals, such as nickel, cobalt, copper, gold, palladium, or platinum nanowires, as well known in the art. The metal particles may also be doped with one or more non-metal dopant species, such as nitrogen, phosphorus, arsenic, or silicon to result in a metal nitride, metal phosphide, metal arsenide, or metal suicide composition. Many of these doped metal compositions are known to have semiconductive properties. In some embodiments, metal particles are excluded from the bonded magnet.

The initial or further homogeneous mixture or resulting bonded magnet may also include an anti-oxidant compound. The anti-oxidant is generally of such composition and included in such amount as to help protect the magnetic particles from oxidizing during the additive manufacturing process. In some embodiments, the anti-oxidant is a phenolic compound, such as phenol or a substituted phenol (e.g., 2,6-di-t-butyl-4-methylphenol). In other embodiments, the anti-oxidant is a complexant molecule, such as EDTA. The anti-oxidant is typically included in the initial or further homogeneous mixture or resulting bonded magnet in an additive amount, typically up to or less than 5, 2, or 1 wt. %.

In some embodiments, the initial or further homogeneous mixture or resulting bonded magnet includes one or more additional components that desirably modulate the physical properties of the initial or further homogeneous mixture and resulting bonded magnet. In particular embodiments, a plasticizer is included in the initial or further homogeneous mixture, typically to promote plasticity (i.e., fluidity) and to inhibit melt-fracture during the extrusion (compounding and/or plastication) process. The one or more plasticizers included in the initial or further homogeneous mixture can be any of the plasticizers well known in the art and appropriate for the particular polymer being extruded. For example, in a first embodiment, the plasticizer may be a carboxy ester compound (i.e., an esterified form of a carboxylic or polycarboxylic acid), such as an ester based on succinic acid, glutaric acid, adipic acid, terephthalic acid, sebacic acid, maleic, dibenzoic acid, phthalic acid, citric acid, and trimellitic acid. In a second embodiment, the plasticizer may be an ester-, amide-, or ether-containing oligomer, such as an oligomer of caprolactam, wherein the oligomer typically contains up to or less than 10 or 5 units. In a third embodiment, the plasticizer may be a polyol (e.g., a diol, triol, or tetrol), such as ethylene glycol, diethylene glycol, triethylene glycol, glycerol, or resorcinol. In a fourth embodiment, the plasticizer may be a sulfonamide compound, such as N-butylbenzenesulfonamide, N-ethyltoluenesulfonamide, or N-(2-hydroxypropyl)benzenesulfonamide. In a fifth embodiment, the plasticizer may be an organophosphate compound, such as tributyl phosphate or tricresyl phosphate. In a sixth embodiment, the plasticizer may be an organic solvent. The organic solvent considered herein is a compound that helps to soften or dissolve the polymer and is a liquid at room temperature (i.e., a melting point of no more than about 10, 20, 25, or 30° C.). Depending on the type of polymer, the organic solvent may be, for example, any of those mentioned above (e.g., ethylene glycol or glycerol), or, for example, a hydrocarbon (e.g., toluene), ketone (e.g., acetone or butanone), amide (e.g., dimethylformamide), ester (e.g., methyl acetate or ethyl acetate), ether (e.g., tetrahydrofuran), carbonate (e.g., propylene carbonate), chlorohydrocarbon (e.g., methylene chloride), or nitrile (e.g., acetonitrile). In some embodiments, one or more classes or specific types of any of the above plasticizers are excluded from the mixture. In some embodiments, the plasticizer or other auxiliary component may be removed from the extrudate by subjecting the extrudate to a post-bake process that employs a suitably high temperature capable of volatilizing the plasticizer or other auxiliary component.

Other (auxiliary) components may be included in the initial or further homogeneous mixture in order to favorably affect the physical or other properties of the mixture (before or during extrusion) or the final bonded magnet. For example, an electrical conductivity enhancing agent, such as conductive carbon particles, may be included to provide a desired level of conductivity, if so desired. To suitably increase the rigidity of the extruded or final magnetic composite, a hardening agent, such as a crosslinking agent, curing agent, or a filler (e.g., talc), may also be included. To improve or otherwise modify the interfacial interaction between the magnetic particles or auxiliary particles and polymeric binder, a surfactant or other interfacial agent may be included. To impart a desired color to the final composite fiber, a coloring agent may also be included. In other embodiments, one or more classes or specific types of any the above additional components may be excluded from the mixture.

In some embodiments, in step (iii), the pellet is exposed to an external magnetic field as the pellet is subjected to compression, to result in magnetic and/or physical alignment of anisotropic magnetic particles in the bonded magnet. Magnetically isotropic particles are generally not capable of alignment by an external magnetic field. For the magnetic particles to become aligned, the magnetic particles should be hard (permanent). Soft magnetic particles are generally not capable of alignment by an external magnetic field. In some embodiments, the pellet being subjected to compression is exposed to a directional (external and non-varying) magnetic field of sufficient strength to align the particles having a hard magnetic composition.

The alignment of the magnetic particles refers to at least an alignment of the individual magnetic fields (or poles) of the magnetic particles. In the case of anisotropically shaped magnetic particles, the alignment also involves a physical alignment, e.g., axial alignment of filamentous particles. The polymer may also undergo alignment, particularly if the polymer includes an aromatic component. In order to sufficiently align the magnetic particles and/or polymer, the external magnetic field should generally have a magnetic field strength of at least 0.5 Tesla (0.5 T). In different embodiments, the external magnetic field has a magnetic field strength of about, at least, above, up to, or less than, for example, 0.5, 1, 1.2. 1.5, 2, 2.5, 3, 3.5, 4, 5, 6, 7 or 8 T.

In some embodiments, particularly where a hybrid polymer is used, the bonded magnet object produced in step (iii) is cured by subjecting the bonded magnet to conditions that result in substantial crosslinking to the extent that the thermoplastic behavior of the bonded magnet transitions to thermoset behavior. In some embodiments, substantially complete crosslinking occurs by allowing the bonded magnet object produced in step (iii) to cool over time. The length of time may be any suitable period of time (e.g., hours or days) for the bonded magnet object produced in step (iii) to undergo substantially complete crosslinking. In other embodiments, the bonded magnet object produced in step (iii) is subjected to an energetic source that promotes or induces crosslinking. The energetic source may be, for example, thermal energy, electromagnetic irradiation (e.g., ultraviolet, x-ray or gamma-ray energy), or ion bombardment (e.g., electron or neutron beam irradiation).

Examples have been set forth below for the purpose of illustration and to describe certain specific embodiments of the invention. However, the scope of this invention is not to be in any way limited by the examples set forth herein.

EXAMPLES

Bonded Permanent Magnet Produced by Extrusion-Compression Method

The following experiments demonstrate two significant advances in the art of bonded magnet manufacturing. First, additively printed or injection molded isotropic or anisotropic bonded magnets can be recycled by a straight-forward and cost effective manner by use of the above described extrusion-compression manufacturing process. Second, anisotropic bonded magnets can be produced according to the extrusion-compression manufacturing process with exposure to an external magnetic field to achieve high performance magnets with exceptional magnetic alignment. In any of these methods, carbon fibers (short or long lengths) can be blended into the composites during production to improve the mechanical properties of the magnets.

A schematic illustration of the presently described extrusion-compression molding process is shown in FIG. 1. The feedstock can contain carbon fibers that are pre-embedded in polymers or added separately to the mixture. Also, the feedstock can be magnet-polymer filaments or end-of-life bonded magnets. The polymer can be, for example, nylon, polyphenylene sulfide (PPS), or other thermoplastic. The magnet loading can be as high as 80 vol %, 85 vol %, 90 vol %, or higher. The magnetic particle composition can be, for example, NdFeB (with Dy or not), SmCo, SmFeN, or FeN.

The extruded material in the compression mold can be exposed to an external magnetic field (by, for example, electromagnets or sintered magnets) to align the magnetic particles/domains in a preferred direction during compression molding to achieve a high performance magnet. The temperature of the extrusion process can be as high as 400-500° C., although the temperature is more typically 200-300° C.

Figure 2:
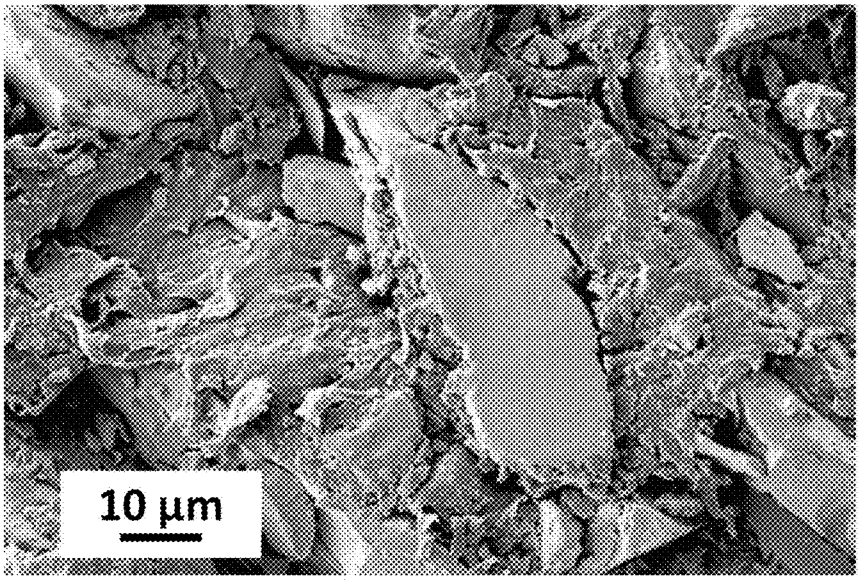
FIG. 2. Scanning electron microscope (SEM) micrograph of the extrusion-compression molded bonded magnet surface (fractured).
Figure 3:
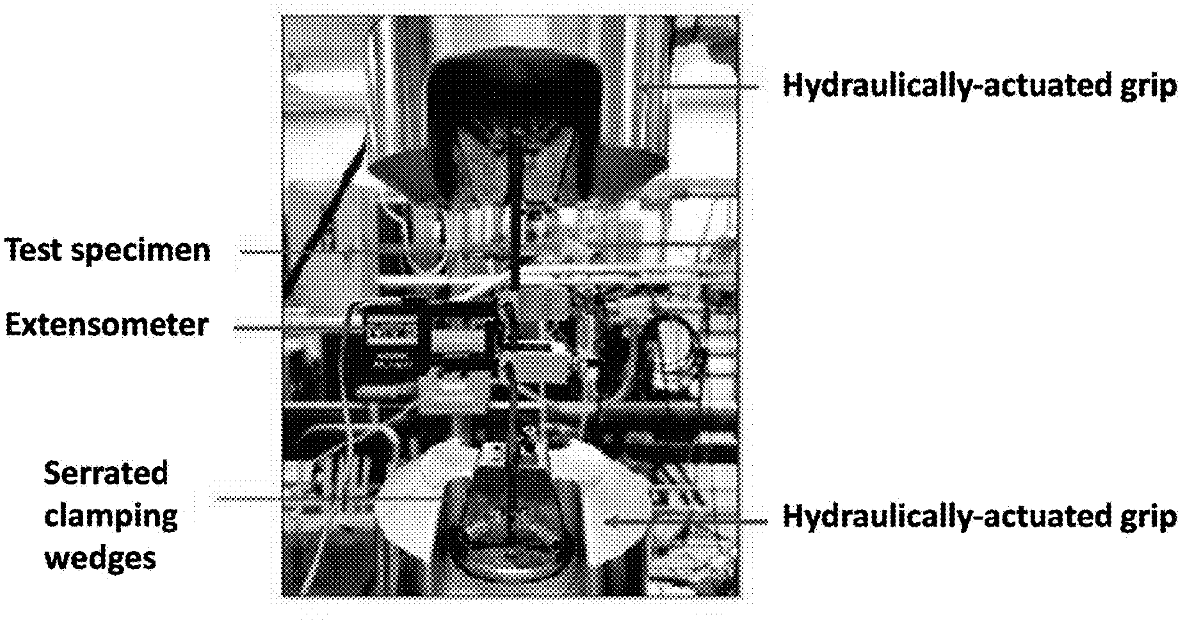
FIG. 3. Photograph of the experimental set-up used for the tensile evaluation of the extrusion-compression molded bonded magnets.

The microstructure of a fractured sample of a bonded magnet produced as above is shown in FIG. 2. The experimental setup for the tensile evaluation of magnet parts is shown in FIG. 3. The dimensions of test specimens and summary of mechanical properties are reported in Table 1 below.

TABLE 1

Summary of mechanical properties

| Sample ID | Tensile strength (MPa) | Failure strain (%) |
|---|---|---|
| NdFeB -Nylon without carbon fiber 4 | 8.20 | 0.202 |
| NdFeB-Nylon without carbon fiber 5 | 7.40 | 0.159 |
| NdFeB-Nylon without carbon fiber 6 | 9.10 | 0.258 |
| NdFeB -Nylon without carbon fiber 7 | 8.70 | 0.240 |
| Average | 8.35 ± 0.73 | 0.215 ± 0.044 |
| NdFeB-Nylon with carbon fiber 1 | 9.20 | 0.438 |
| NdFeB-Nylon with carbon fiber 2 | 9.40 | 0.537 |
| NdFeB-Nylon with carbon fiber 3 | 11.20 | 0.449 |
| NdFeB-Nylon with carbon fiber 4 | 9.20 | 1.245 |

TABLE 1-continued

| Summary of mechanical properties | | |
|---|---|---|
| Sample ID | Tensile strength (MPa) | Failure strain (%) |
| NdFeB-Nylon with carbon fiber 5 | 9.30 | 0.745 |
| NdFeB-Nylon with carbon fiber 6 | 8.40 | 0.526 |
| Average | 9.45 ± 0.93 | 0.657 ± 0.309 |

Figures 4A, 4B:
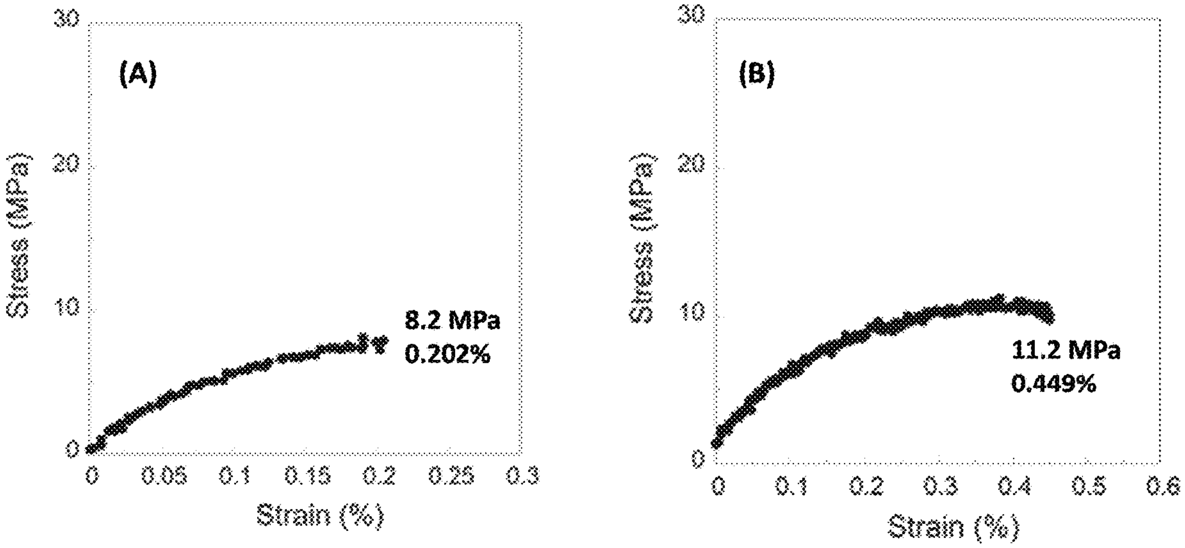
FIGS. 4A-4B.

FIGS. 4A and 4B show stress vs. strain curves for recycled 70 vol % NdFeB/nylon magnets (without NdFeB-nylon-4 and with carbon fiber additions NdFeB-Nylon). In general, the mechanical responses for both types of magnets (with and without carbon fiber additions) were found to be very reproducible. The tensile stress-strain curves for the bonded magnets exhibited a significant amount of plastic deformation. The bonded magnets with carbon fiber addition exhibited both higher tensile strength and larger strain to failure compared to NdFeB-nylon composites.

Figures 5A, 5B:
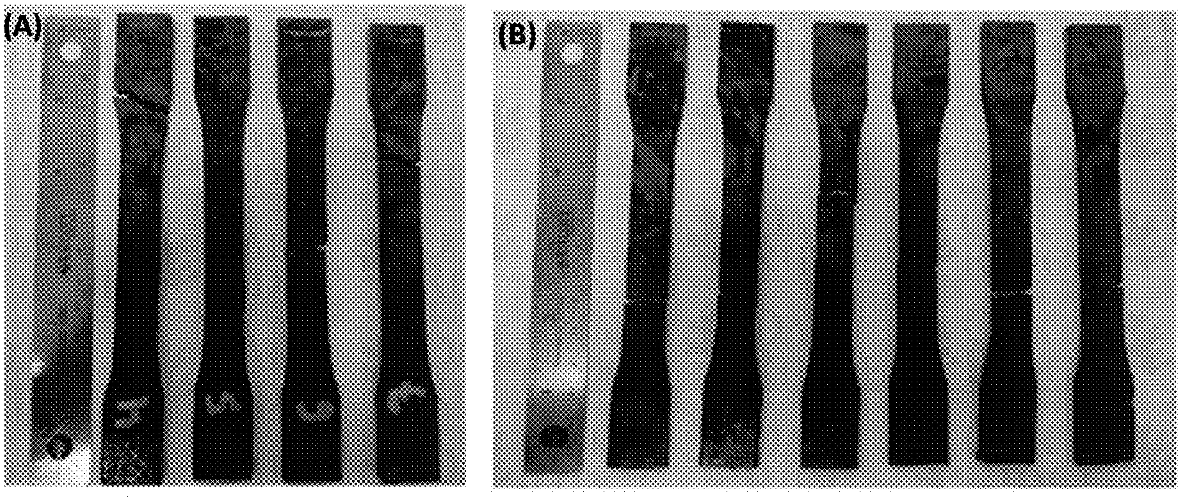
FIGS. 5A-5B.

FIG. 5A shows images of dog-bone samples of NdFeB/nylon with no carbon fiber and FIG. 5B shows images of NdFeB/nylon with carbon fiber containing bonded magnets, both after tensile testing. FIG. 5A (NdFeB/nylon with no carbon fiber specimens after tensile testing) shows the location of the failure where the sample cracked. FIG. 5B (NdFeB/nylon with carbon fiber specimens after tensile testing) shows the location of the failure where the sample cracked.

While there have been shown and described what are at present considered the preferred embodiments of the invention, those skilled in the art may make various changes and modifications which remain within the scope of the invention defined by the appended claims.

What is claimed is:

1. A bonded magnet composition comprising a thermoplastic polymer and magnetic particles homogeneously dispersed therein, wherein said polymer composite possesses a magnetic particle loading of at least 80 vol %, and the polymer composite exhibits a maximum energy product varying by less than 5% throughout the bonded magnet composition.

2. The bonded magnet composition of claim 1, wherein the bonded magnet composition possesses a magnetic particle loading of at least 85 vol %.

3. The bonded magnet composition of claim 1, wherein said magnetic particles are soft magnetic particles.

4. The bonded magnet composition of claim 3, wherein said soft magnetic particles have an iron oxide or iron-containing alloy composition.

5. The bonded magnet composition of claim 1, wherein said magnetic particles are permanent magnetic particles.

6. The bonded magnet composition of claim 5, wherein said permanent magnetic particles have a rare earth composition.

7. The bonded magnet composition of claim 6, wherein said permanent magnetic particles have a samarium-containing, neodymium-containing, or praseodymium-containing composition.

8. The bonded magnet composition of claim 6, wherein said permanent magnetic particles have a $Nd_2Fe_{14}B$ composition.

9. The bonded magnet composition of claim 1, wherein said mixture further comprises carbon fiber particles.

10. The bonded magnet composition of claim 1, wherein said magnetic particles are magnetically anisotropic.

11. The bonded magnet composition of claim 1, wherein said thermoplastic polymer comprises polycarbonate.

12. The bonded magnet composition of claim 1, wherein said magnetic particles have an anisotropic shape.

13. The bonded magnet composition of claim 1, wherein the bonded magnet composition possesses a magnetic particle loading of at least 90 vol %.

14. The bonded magnet composition of claim 1, wherein said magnetic particles have a $Nd_2Fe_{14}B$ composition and said thermoplastic polymer has a nylon composition.

15. The bonded magnet composition of claim 1, wherein said bonded magnet composition possesses a maximum energy product of at least 15 MGOe.

16. A method for producing a bonded magnet, the method comprising:

(i) low-shear compounding of a thermoplastic polymer and magnetic particles to form an initial homogeneous mixture of said thermoplastic polymer and magnetic particles;

(ii) feeding said initial homogeneous mixture into a plasticator comprising a low-shear single screw rotating unidirectionally toward a die orifice, wherein said low-shear single screw is housed within a heated barrel to result in heating of the initial homogeneous mixture until the thermoplastic polymer melts and forms a further homogeneous mixture, wherein said further homogeneous mixture is transported within threads of the single screw towards the die orifice and exits the die orifice as a solid pellet;

(iii) conveying said solid pellet into a mold and subjecting said solid pellet to compression molding while said pellet is in said mold, to form said bonded magnet, wherein said bonded magnet possesses a magnetic particle loading of at least 80 vol % and exhibits a maximum energy product varying by less than 5% throughout the bonded magnet.

17. The method of claim 16, wherein the bonded magnet composition possesses a magnetic particle loading of at least 85 vol %.

18. The method of claim 16, wherein said magnetic particles are soft magnetic particles.

19. The method of claim 18, wherein said soft magnetic particles have an iron oxide or iron-containing alloy composition.

20. The method of claim 16, wherein said magnetic particles are permanent magnetic particles.

21. The method of claim 20, wherein said permanent magnetic particles have a rare earth composition.

22. The method of claim 21, wherein said permanent magnetic particles have a samarium-containing, neodymium-containing, or praseodymium-containing composition.

23. The method of claim 21, wherein said permanent magnetic particles have a $Nd_2Fe_{14}B$ composition.

24. The method of claim 16, wherein said initial homogeneous mixture further comprises carbon fiber particles.

25. The method of claim 16, wherein said magnetic particles are magnetically anisotropic.

26. The method of claim 25, wherein, in step (iii), the pellet is exposed to an external magnetic field as the pellet is subjected to compression, to result in magnetic and/or physical alignment of the anisotropic magnetic particles in the bonded magnet.

27. The method of claim 16, wherein said thermoplastic polymer comprises polycarbonate.

28. The method of claim 16, wherein said magnetic particles have an anisotropic shape.

29. The method of claim 16, wherein said thermoplastic polymer and magnetic particles are derived from spent bonded magnet material.

30. The method of claim 29, further comprising, before or during step (i), pulverizing spent bonded magnet material to provide the thermoplastic polymer and magnetic particles in step (i).

31. The method of claim 30, wherein additional thermoplastic polymer, additional magnetic particles, or both, are added before or during step (i) or step (ii).

32. The method of claim 29, wherein said thermoplastic polymer is selected from nylon, polyphenylene sulfide, and polycarbonate.

33. The method of claim 29, wherein said thermoplastic polymer comprises polycarbonate.

* * * * *